United States Patent
Draghetti

[11] Patent Number: 6,042,681
[45] Date of Patent: Mar. 28, 2000

[54] SEALING METHOD FOR CONNECTING PORTIONS OF HEAT-SEAL DIELECTRIC SHEET MATERIAL

[75] Inventor: Fiorenzo Draghetti, Medicina, Italy

[73] Assignee: G.D Societa' Per Azioni, Via Pomponia, Italy

[21] Appl. No.: 08/818,775

[22] Filed: Mar. 14, 1997

[30] Foreign Application Priority Data

Mar. 15, 1996 [IT] Italy .................................. BO96A0138

[51] Int. Cl.[7] ................................................... B32B 31/00
[52] U.S. Cl. ................................... 156/273.1; 156/274.4; 156/275.1; 156/308.4
[58] Field of Search ............................. 156/273.1, 274.4, 156/275.1, 308.4; 493/189, 111; 53/463, 466

[56] References Cited

U.S. PATENT DOCUMENTS

| | | |
|---|---|---|
| 2,460,460 | 2/1949 | Langer .................................. 156/308.4 |
| 4,022,648 | 5/1977 | Woodberry et al. . |
| 4,182,222 | 1/1980 | Stahl . |
| 4,419,855 | 12/1983 | Shanklin . |
| 4,824,425 | 4/1989 | Stock . |
| 4,945,709 | 8/1990 | Cerf . |
| 4,947,605 | 8/1990 | Ramsey ..................................... 53/442 |
| 5,083,999 | 1/1992 | Barta . |
| 5,154,035 | 10/1992 | Cavazza ..................................... 53/77 |
| 5,156,712 | 10/1992 | Post . |

FOREIGN PATENT DOCUMENTS

| | | |
|---|---|---|
| 166629 | 1/1986 | European Pat. Off. . |
| 683034 | 11/1995 | European Pat. Off. . |
| 2167616 | 8/1973 | France . |
| 2414070 | 8/1979 | France . |
| 9006014 | 9/1990 | Germany . |

*Primary Examiner*—Jeff H. Aftergut
*Attorney, Agent, or Firm*—Klauber & Jackson

[57] ABSTRACT

A sealing method for connecting portions of heat-seal dielectric sheet material, the method including the steps of superimposing the portions for sealing one on top of the other; generating a substantial vacuum between the two superimposed portions by exposing the portions to an electric field; and sealing the two portions together by exposing them to a heat source.

2 Claims, 1 Drawing Sheet

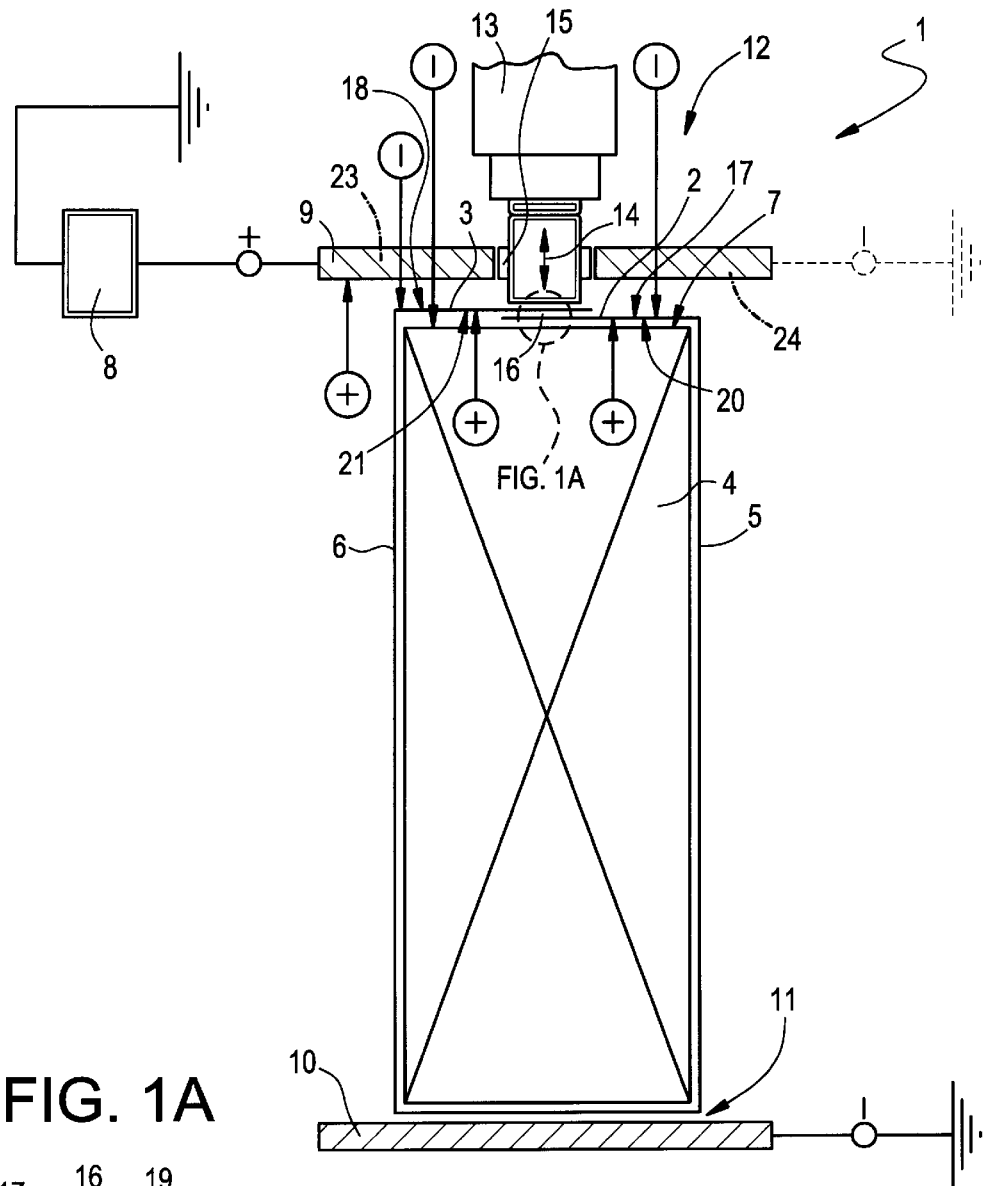
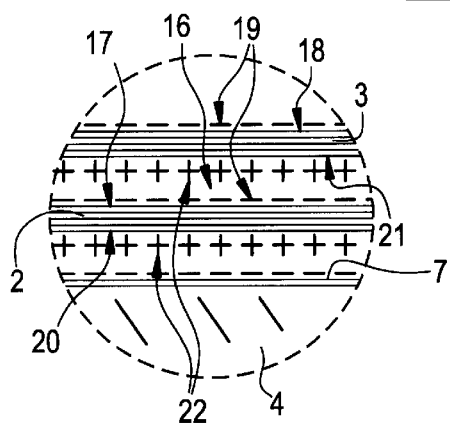

SEALING METHOD FOR CONNECTING PORTIONS OF HEAT-SEAL DIELECTRIC SHEET MATERIAL

BACKGROUND OF THE INVENTION

The present invention relates to a sealing method for connecting portions of heat-seal dielectric sheet material.

The present invention is particularly advantageous for use on overwrapping machines, particularly machines for cellophaning packets or cartons of cigarettes, to which the following description refers purely by way of example.

On cellophaning machines of the above type, a sheet of transparent synthetic heat-seal material, normally polypropylene, is folded into a U about a respective product comprising a carton or packet of cigarettes, so that two opposite portions of the sheet project beyond the product; the two portions are then folded one on top of the other and onto an outer surface of the product to form a tubular wrapping; and the wrapping is stabilized by heat-sealing the two portions together by means of heat applied, for example, by a heat-sealing device or any other external heat source.

On known cellophaning machines, heat-sealing the two portions together normally poses serious difficulties, mainly due to them not adhering perfectly to each other during heat-sealing. The presence, in fact, of even only relatively small air pockets between the two portions impairs heat transmission between them, so that hotter sources than strictly necessary must be used, and which may easily result in singeing of the portions in the event of even only a slight variation in exposure time. Moreover, as it is expanded by the heat transmitted during sealing, the air inside the pockets may cause the heat-seal portion to burst, thus detaching the portions one from the other.

SUMMARY OF THE INVENTION

It is an object of the present invention to provide a method designed to overcome the above drawbacks.

According to the present invention, there is provided a sealing method for connecting portions of heat-seal dielectric sheet material, the method comprising the steps of superimposing the portions for sealing one on top of the other; and sealing the two portions to each other by exposing them to a heat source; and being characterized by also comprising the intermediate step of forming a substantial vacuum between the two superimposed portions by generating between the portions an electrostatic force of attraction.

Said force is preferably generated by forming a first given distribution of electric charges on a first surface of a first of said portions, and a second distribution of charges of opposite sign on a second surface of a second of said portions; said first and second surfaces facing each other.

According to a preferred embodiment of the above method, said distributions of electric charges are formed by induction by placing the two portions inside an external electric field.

According to a further preferred embodiment of the above method, said distributions of electric charges are formed by depositing charges on at least one of said portions.

BRIEF DESCRIPTION OF THE DRAWING

The present invention will be described with reference to the accompanying drawing, which shows a schematic side view, with parts in section and parts removed for clarity, of a non-limiting embodiment by way of example.

DETAILED DESCRIPTION OF THE INVENTION

Number 1 in the accompanying drawing indicates a sealing unit for sealing two portions 2 and 3 of heat-seal dielectric sheet material.

In the example shown, unit 1 forms part of an overwrapping machine, in particular a cellophaning machine, for overwrapping products 4 preferably comprising packets or cartons of cigarettes made, at least externally, of dielectric material; and portions 2 and 3 constitute the end portions of a sheet 5 of heat-seal dielectric overwrapping material, preferably polypropylene, which is folded about a respective product 4 to form a tubular wrapping 6. For which purpose, sheet 5 is first folded into a U in known manner (not shown) about respective product 4, so that end portions 2 and 3 project beyond an outer lateral surface 7 of product 4; and portions 2 and 3, initially parallel to each other, are then folded in known manner (not shown) one on top of the other and onto surface 7, with portion 3 overlapping portion 2, so as to define tubular wrapping 6, which is stabilized by sealing portions 2 and 3 to each other.

Unit 1 comprises an electrostatic source 8, and two parallel plates 9 and 10 made of electrically conductive material. Plates 9 and 10 define a passage 11 for receiving a product 4 and respective tubular wrapping 6 with portions 2 and 3 facing and adjacent to plate 9; and plates 9 and 10 are connected electrically to respective poles of source 8 to define the plates of a capacitor 12 for generating an electric field through passage 11.

Unit 1 also comprises a sealing device 13, which is movable, in a direction 14 perpendicular to plates 9 and 10, and through a central opening 15 in plate 9, into a position temporarily contacting a sealing portion 16 of portions 2 and 3 of wrapping 6 of a product 4 located, in use, inside passage 11.

In actual use, the electric field generated through passage 11 induces, on respective outer surfaces 17 and 18 of portions 2 and 3, a distribution of electric charges 19 opposite in sign to the electric charges distributed on plate 9 facing surfaces 17 and 18. At the same time, the electric field induces, on respective inner surfaces 20 and 21 of portions 2 and 3, a distribution of electric charges 22 opposite in sign to electric charges 19 distributed on outer surfaces 17 and 18. And at sealing portion 16, which is substantially defined by the superimposed portions of portions 2 and 3, the distribution of electric charges 22 of inner surface 21 of portion 3 faces the distribution of electric charges 19, of opposite sign, of outer surface 17 of portion 2 to form an electrostatic force of attraction between surfaces 17 and 21, so that portions 2 and 3 adhere and are substantially vacuum connected to each other.

This therefore provides for substantially totally eliminating any air between portions 2 and 3, so that, when sealing device 13 is brought into contact with outer surface 18 of portion 3, portions 2 and 3 may be sealed with a minimum amount of heat required.

According to a variation indicated by the dot-and-dash lines in the accompanying drawing, plate 10 of unit 1 is dispensed with, and plate 9 is divided into two coplanar portions 23 and 24, which are connected mechanically to each other by an insulating element (not shown), are located on either side of sealing device 13, and are connected electrically to respective poles of source 8 to generate an electric field also locally affecting sealing portion 16, and so generate said electrostatic force of attraction between portions 2 and 3.

I claim:

1. A method for wrapping a product with a heat-seal dielectric sheet material, the method comprising folding said sheet material into a U about said product so that the end portions of said sheet material project beyond an outer lateral surface of said product; folding said end portions one on top of the other and onto said lateral surfaces so as to define a tubular wrapping forming a substantial vacuum between said two end portions by generating between said end portions an electrostatic force of attraction; and sealing said two end portions to each other by exposing them to heat source; said electrostatic force of attraction being generated by placing a first and second electrode of an electrostatic source in positions adjacent to said tubular wrapping; said first electrode being arranged facing, and adjacent to, at least a first of said two portions; wherein said electrostatic force of attraction is generated by placing said first electrode facing said lateral surface, and said second electrode facing an opposite lateral surface of the product; and said electrostatic force of attraction is generated by forming a first given distribution of electric charges on a first surface of said first portion, and a second distribution of charges of opposite sign on a second surface of said second portion; said first and second surfaces facing each other.

2. A method for wrapping a product with a heat-seal dielectric sheet material, the method comprising folding said sheet material into a U about said product so that the end portions of said sheet material project beyond an outer lateral surface of said product; folding said end portions one on top of the other and onto said lateral surfaces so as to define a tubular wrapping forming a substantial vacuum between said two end portions by generating between said end portions an electrostatic force of attraction; and sealing said two end portions to each other by exposing them to heat source; said electrostatic force of attraction being generated by placing a first and second electrode of an electrostatic source in positions adjacent to said tubular wrapping; said first electrode being arranged facing, and adjacent to, at least a first of said two portions; wherein said electrostatic force of attraction is generated by placing both said electrodes in positions facing, and adjacent to, said first and a second of said two portions, respectively; and said electrostatic force of attraction is generated by forming a first given distribution of electric charges on a first surface of said first portion, and a second distribution of charges of opposite sign on a second surface of said second portion; said first and second surfaces facing each other.

* * * * *